United States Patent
Chen

(10) Patent No.: US 6,681,117 B2
(45) Date of Patent: Jan. 20, 2004

(54) SWITCHING CONTROL DEVICE FOR TRANSMITTING CELLULAR PHONE CALLS TO FIXED-NETWORK TELEPHONE

(75) Inventor: Stephen Chen, Chang Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 595 days.

(21) Appl. No.: 09/753,603

(22) Filed: Jan. 4, 2001

(65) Prior Publication Data

US 2002/0086666 A1 Jul. 4, 2002

(51) Int. Cl.$^7$ ................................................ H04M 1/00
(52) U.S. Cl. ................ 455/552.1; 455/553.1; 455/556.1
(58) Field of Search ................. 455/417, 418, 455/461, 422.1, 426.1, 426.2, 435.2, 435.3, 440, 450, 462, 525, 66.1, 74.1, 550.1, 552.1, 553.1, 556.1, 557, 560, 561, 573

(56) References Cited

U.S. PATENT DOCUMENTS 5,903,833 A * 5/1999 Jonsson et al. ............. 455/417
6,151,500 A * 11/2000 Cardina et al. ........... 455/435.2
6,427,074 B1 * 7/2002 Chavez et al. .............. 455/417

* cited by examiner

Primary Examiner—Sinh Tran
Assistant Examiner—Julio R Perez
(74) Attorney, Agent, or Firm—Rosenberg, Klein & Lee

(57) ABSTRACT

A switching control device for transmitting calls received by a cellular phone to a fixed-network telephone enables people to receive calls transmitted to a cellular phone by way of a fixed network telephone particularly equipped with a plurality of extension lines via conversion operations. It operates with a cellular phone/fixed network telephone switching device in cooperation with an on/off device. When a cellular phone receives an incoming call, the switching device will first detect the main telephone set and its extension lines of their individual status of use; and the on/off device is selectively actuated of its on and off states and also its vibration ring operation according to the detection. Thereby a user can pick up a nearest extension line without rushing back to a main telephone set when an incoming call is transmitted to a cellular phone.

3 Claims, 13 Drawing Sheets

SWITCHING CONTROL DEVICE FOR TRANSMITTING CELLULAR PHONE CALLS TO FIXED-NETWORK TELEPHONE

BACKGROUND OF THE INVENTION

The present invention relates to a switching control device for transmitting calls received by a cellular phone to a fixed network telephone. Such a device enables people to receive calls transmitted to a cellular phone via a fixed network telephone particularly equipped with a plurality of extension lines by conversion operations. The present invention operates with a cellular phone/fixed network telephone switching device in cooperation with an on/off device. When a cellular phone receives an incoming call, the switching device will first detect the main telephone set and its extension lines of their individual status of use; and the on/off device is selectively actuated of its on and off states and vibration ring operation according to the detection. Thereby a user can pick up a nearest extension line without rushing back to a main telephone set when an incoming call is transmitted to a cellular phone.

Cellular phones have been widely and popularly used by people in modern cities all over the world because they make instant communication possible at any places and any time, facilitating people in everyday life. However, the frequent use of cellular phones do cause bad effect on people's health, especially microwaves can cause people's brains damaged without notice. So, the use of cellular phones brings crisis to people's health. In such a situation, people aware of the danger of using cellular phones try to reduce the frequency of use of cellular phones indoors, they will use cellular phones only outdoors. But many important personal contacts are generally made via cellular phones at homes or in offices, and turning off cellular phones can cause personal communication inconvenient. In that case, people are forced to make use of cellular phones all the time even inside houses with common telephones. To make cellular phones adapted to be operable on an indoor fixed-network telephone, such as at homes and in offices, has been a major concern by people. Such a fixed-network telephone can transform cellular phone calls into communication via the fixed-network telephone.

The conventional device for effecting such a communication transformation is illustrated in FIG. 1. It mainly includes a switching device 11 to which a cellular phone T is to be in inserting connection. Then the switching device 11 is coupled to a fixed network telephone 12 so that incoming calls of the cellular phone T can be transmitted via transformation operations of the switching device 11 to the fixed network telephone 12. When such a switching device 11 is applied to a fixed network telephone with extension lines, there are several problems found in practical use. Referring first to FIG. 2 which shows the wire arrangement of a fixed network telephone with a number of extension lines. The fixed network wiring 3 mainly comprises a main line 30 branched into a main telephone set 32 and several extension lines 33, 34, 35; and only the main telephone set 32 is equipped with a cellular phone/fixed network telephone switching device 31. Once an incoming call is transmitted to the cellular phone T, a person can only receive the call by way of the main telephone set 32. The remaining extension lines will not receive any vibration ring signals at all. Thus, the extension lines become useless in such a situation. This will force a person to rush to the place where the main telephone set 32 is located. Such a problem makes the prior switching device a major disadvantage in use.

SUMMARY OF THE INVENTION

Therefore, the primary object of the present invention is to provide a switching control device for transmitting a cellular phone call to a fixed-network telephone particularly equipped with extension lines in such a manner that people can get a transformed call at the nearest extension line without rushing back and forth in an office or at home.

DETAILED DESCRIPTION OF THE PREFERRED EMBODIMENT

Figure 1:
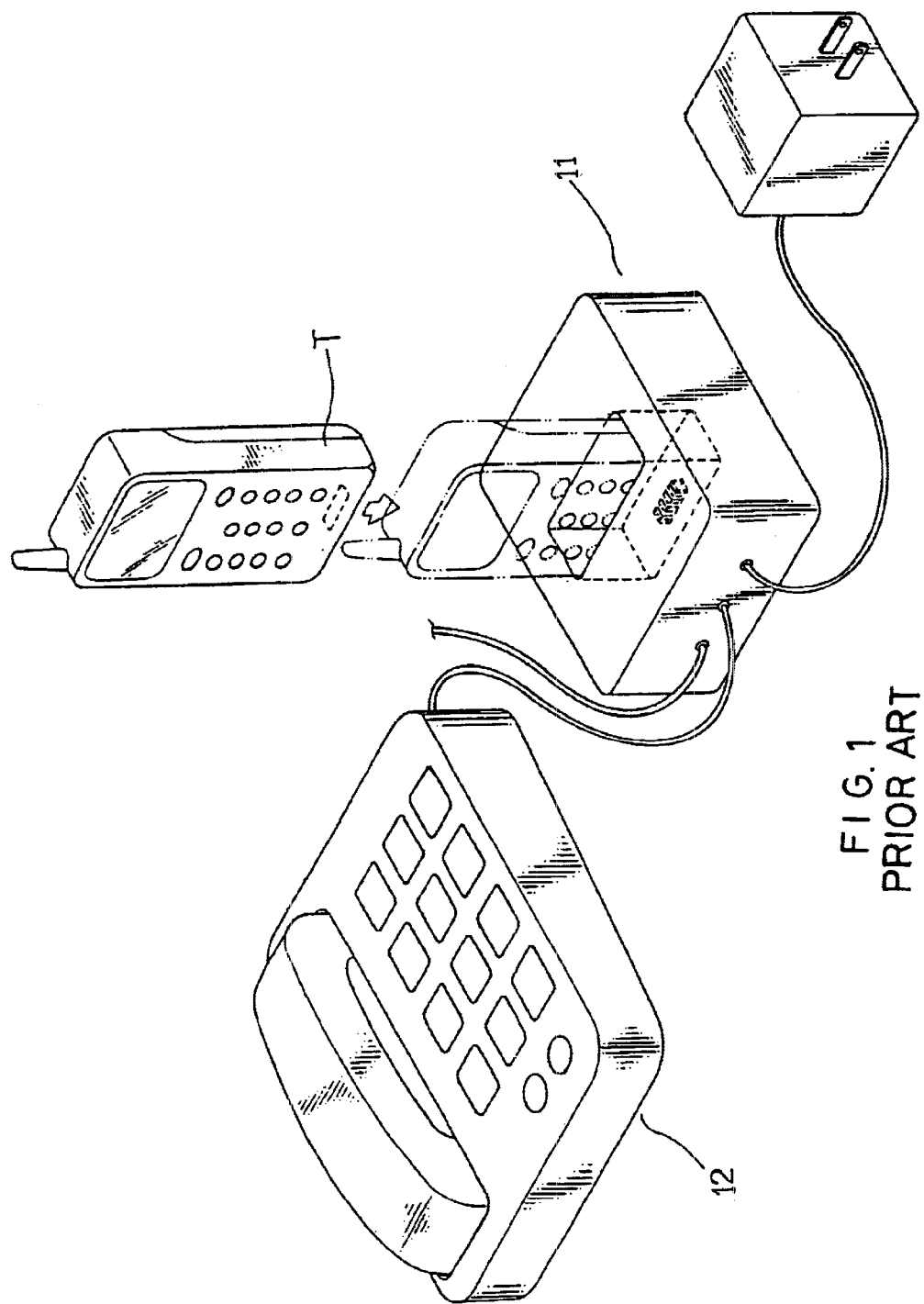
FIG. 1 is a perspective diagram showing a conventional cellular phone/fixed network telephone switching device.
Figure 2:
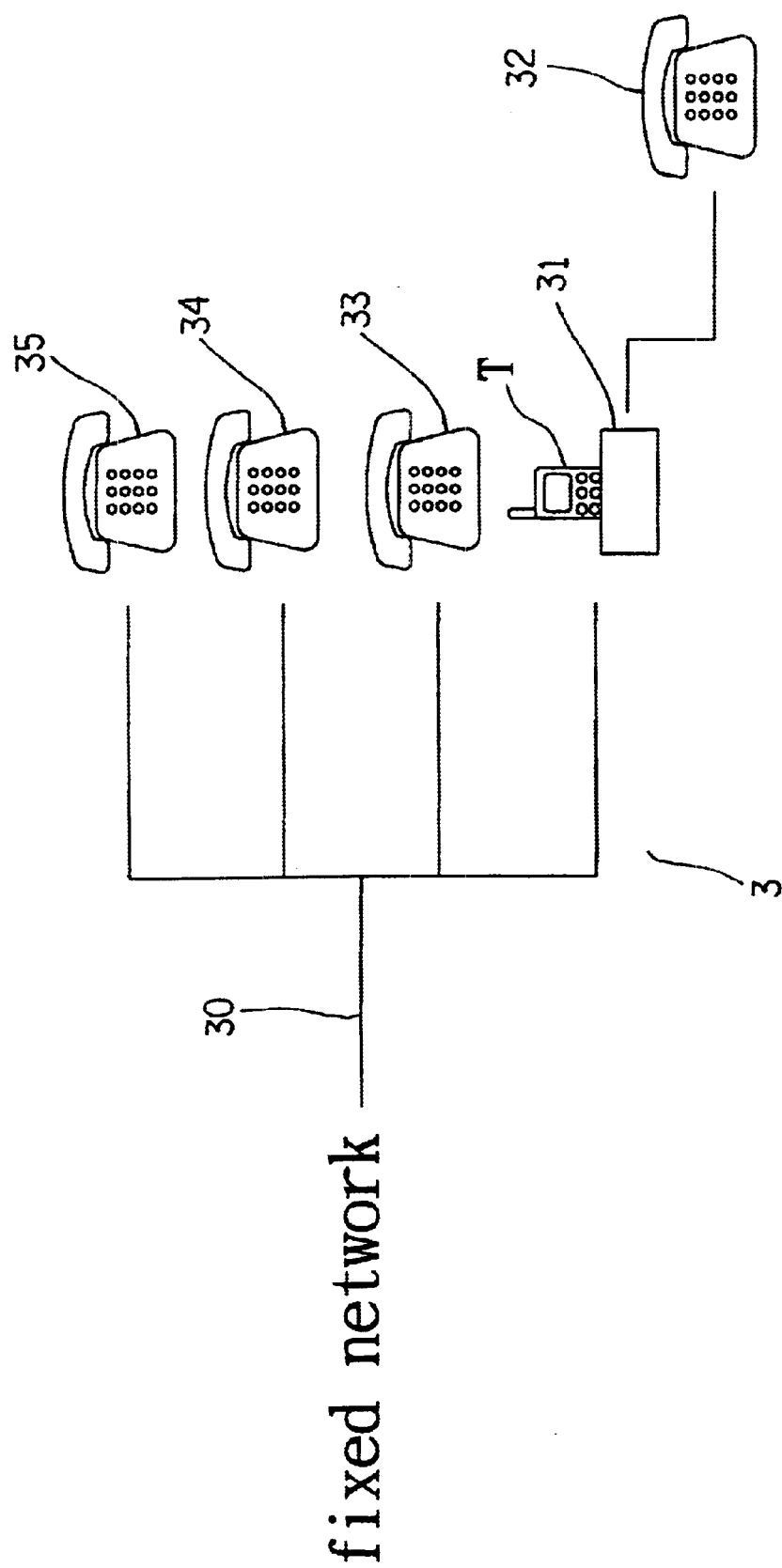
FIG. 2 shows the conventional switching device applied to a fixed network telephone with a plurality of extension lines.
Figure 3:
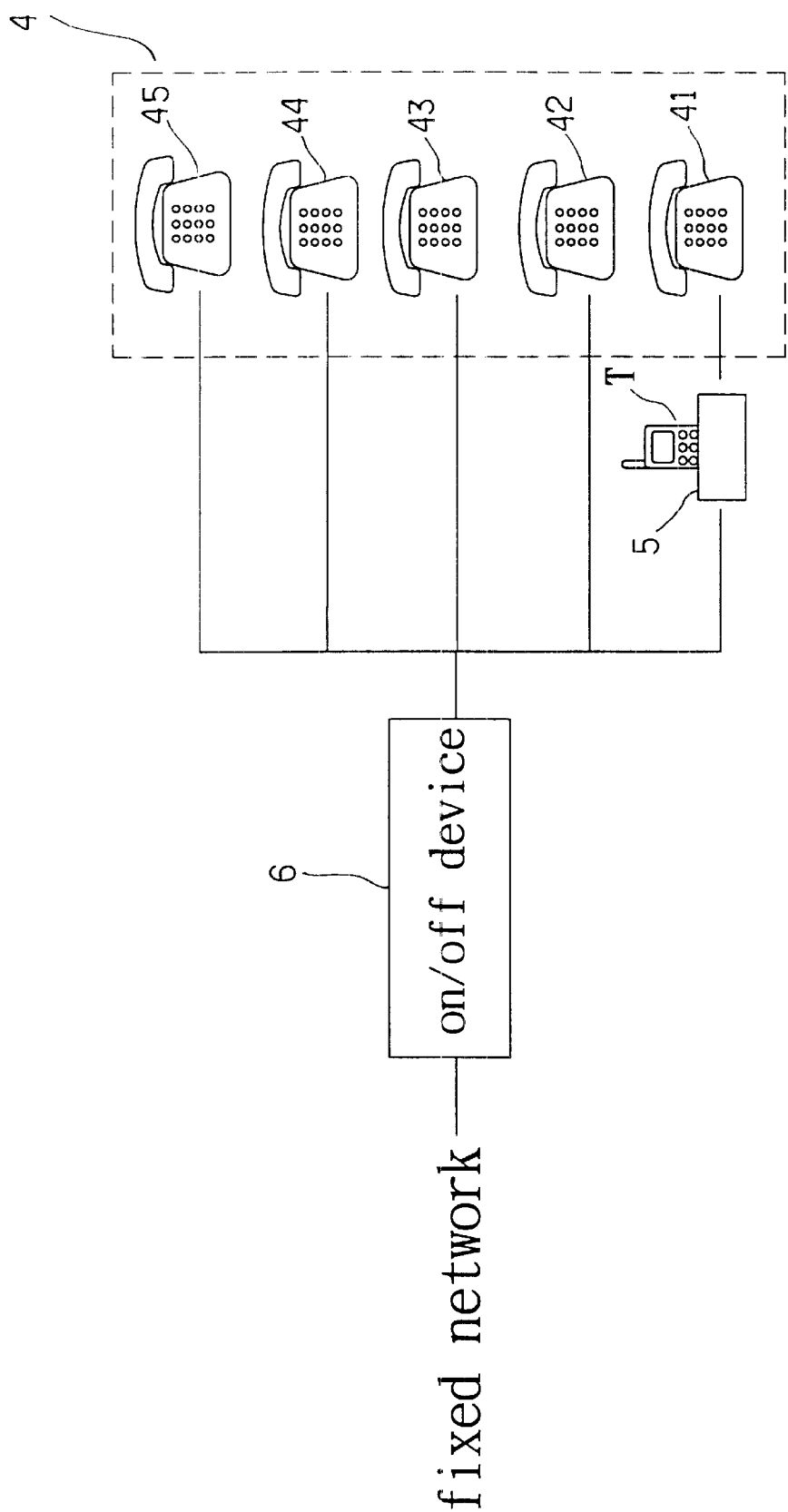
FIG. 3 shows the switching control device of the present invention applied to a fixed network telephone with a plurality of extension lines.
Figure 4:
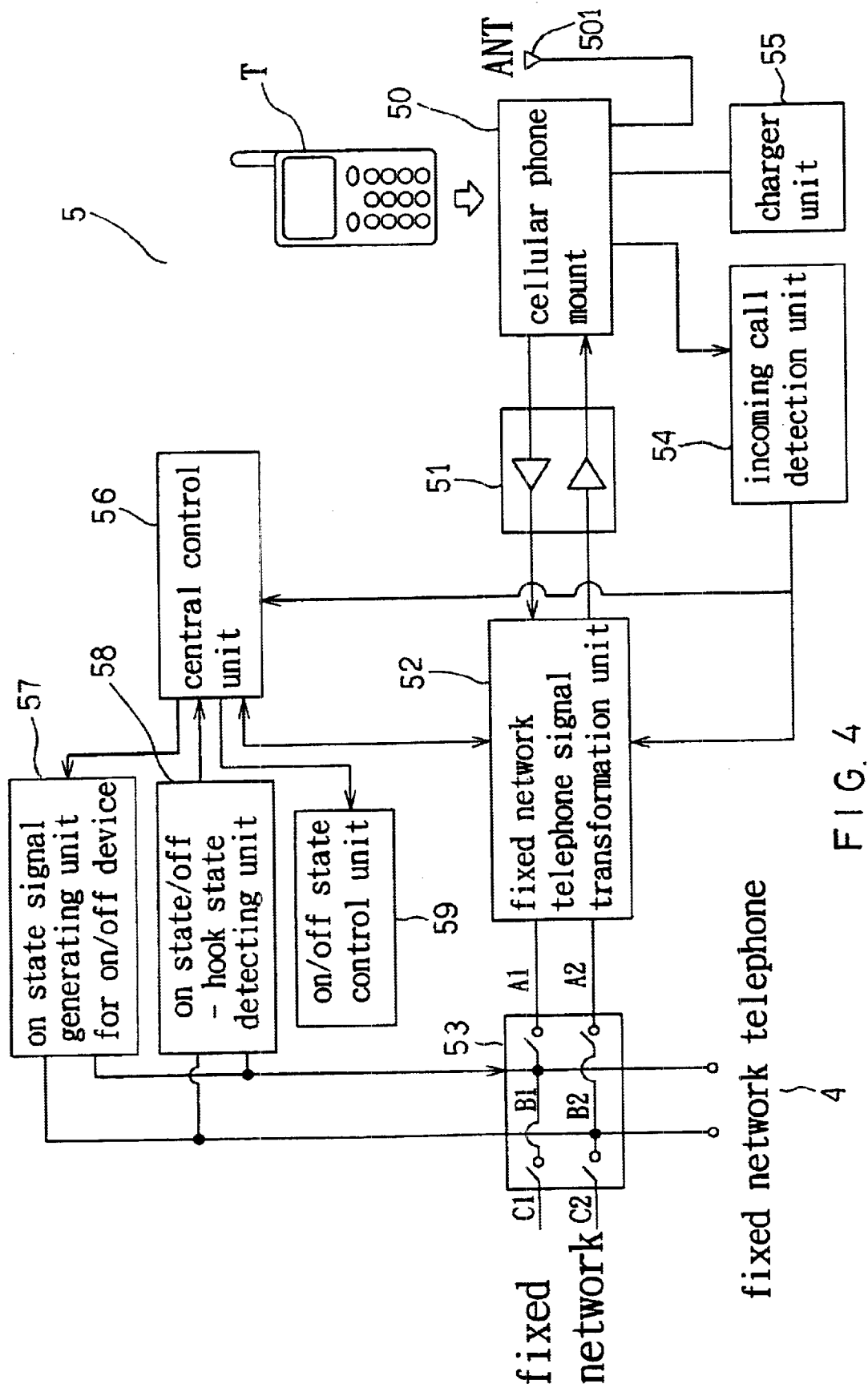
FIG. 4 is the block diagram of the electric circuit of the cellular phone/fixed network telephone switching control device of the present invention.
Figure 5:
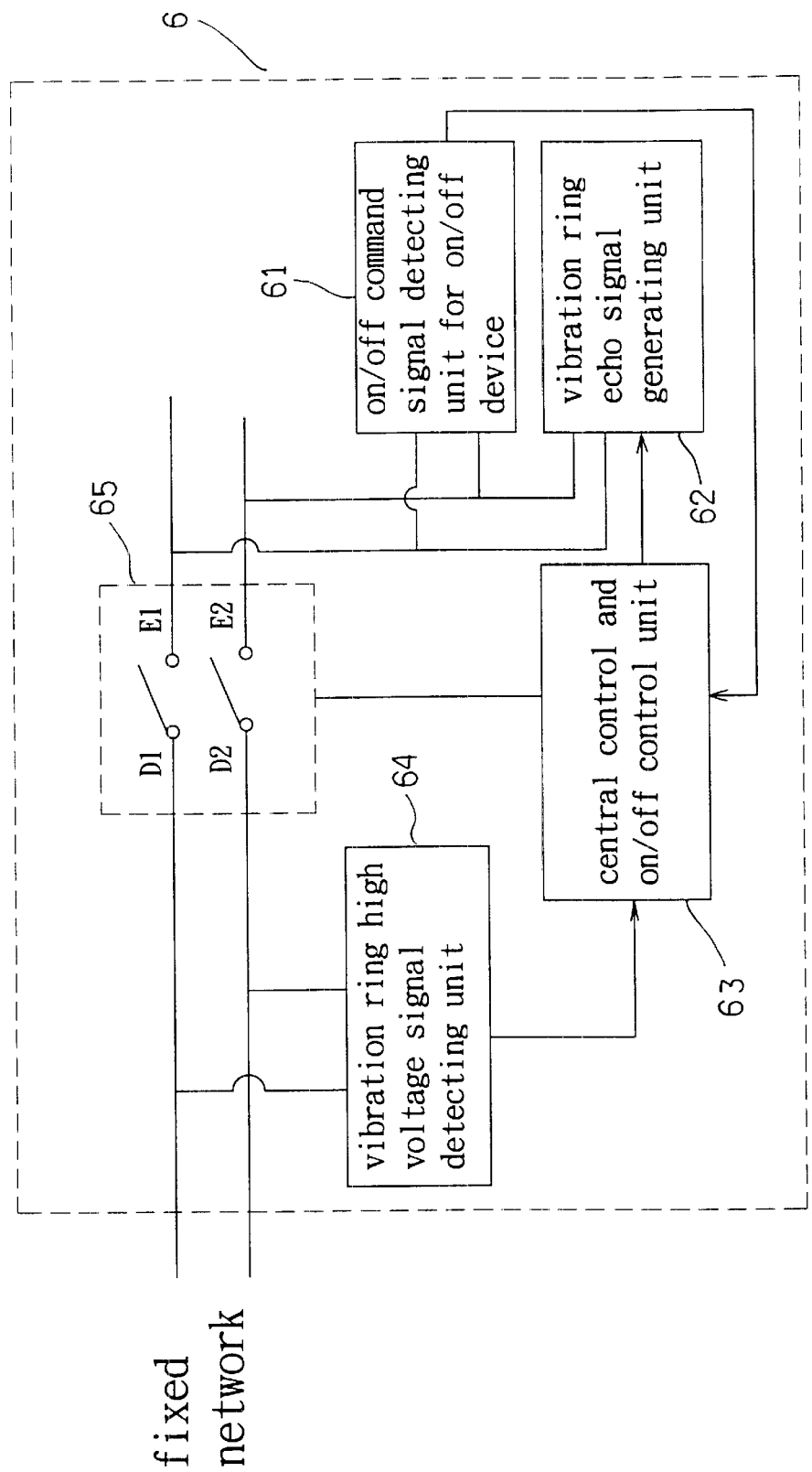
FIG. 5 is the block diagram of the electric circuit of the on/off device of the present invention.

Referring to FIGS. 3–5, the present invention mainly has a cellular phone/fixed network telephone switching device 5 which operates in combination with an on/off device 6. The cellular phone/fixed network telephone switching device mainly includes a cellular phone mount 50, an acoustic frequency signal amplifying unit 51, a fixed network telephone signal transformation unit 52, a fixed network telephone/cellular phone switching unit 53, an incoming call detecting unit 54, a charger unit 55, a central control unit 56, an on state signal generating unit for on/off device 57, an on state/off-hook state detecting unit 58 and an on/off state control unit 59.

The cellular phone mount 50 is used to house a cellular phone T which is coupled by wire to the switching device 5 and is connected to an antenna 501.

The acoustic frequency signal amplifying unit 51 is used to properly amplify the output or input acoustic frequency signals of a cellular phone. If the level of the acoustic input and output of the cellular phone is close to that of the fixed network telephone, then the amplifying rate of the acoustic frequency signal amplifying unit 51 is equal to one.

The fixed network telephone signal transformation unit 52 is used to converting input and output acoustic frequency signals of a cellular phone into acoustic frequency signals compatible with specifications of a fixed network telephone.

The fixed network telephone/cellular phone switching unit 53 is responsible for selective switching connection between a fixed network communication or cellular phone communication to a fixed-network telephone 4 and is subject to the control of the incoming call detecting unit 54.

The incoming call detecting unit 54 is used to detect if an incoming call is transmitted to a cellular phone; and if the cellular phone is being in communication so as to control the operational connection position of the fixed network telephone/cellular phone switching unit 53.

The charger unit 55 is used to supply electrical power to a battery of the cellular phone T when it is put in a stand-by state.

The central control unit 56 operates according to the results of detection of the incoming call detecting unit 54 and the on state/off-hook state detecting unit 58 to control the actions of the on state signal generating unit for on/off device 57, the on/off state control unit 59 and the fixed network telephone signal transformation unit 52.

The on state signal generating unit for on/off device 57 is simplified in the present invention to be a grounding short circuit switch which serves as a short circuit signal generating device. It is controlled by the central control unit 56 to output the on state actuation signal of the on/off device 6.

The on state/off-hook state detecting unit 58 is responsible for detecting the on and off state of the on/off device 6 and the off-hook state of the receiver of a telephone.

The on/off state control unit 59 receives control signals transmitted from the central control unit 56 to control the switching selection of the fixed network telephone/cellular phone switching unit 53.

The on/off device 6 operates in collaboration with the cellular phone/fixed network telephone switching device 5 comprises an on/off command signal detecting unit for on/off device 61, a vibration ring echo signal generating unit 62, a central control and on/off control unit 63, a vibration ring high voltage signal detecting unit 64 and a switching unit 65.

The on/off command signal detecting unit for on/off device 61 is employed to detect the on/off state of the on/off device 6 for the use of the central control and on/off control unit 63.

The vibration ring echo signal generating unit 62 is subject to the control of the central control and on/off control unit 63 to produce vibration ring echo signals.

The central control and on/off control unit 63 controls the on/off switching operation of the switching unit and controls the vibration ring echo signal generating unit 62 to produce vibration ring echo signals according to the detected signals of the vibration ring high voltage signal detecting unit 64 and the on/off command signal detecting unit for on/off device 61.

The vibration ring high voltage signal detecting unit 64 is responsible for detecting the high voltage signals of the vibration ring.

The switching unit 65 is controlled by the central control and on/off control unit 63 to switch between on and off states of the on/off device.

Figure 6A:
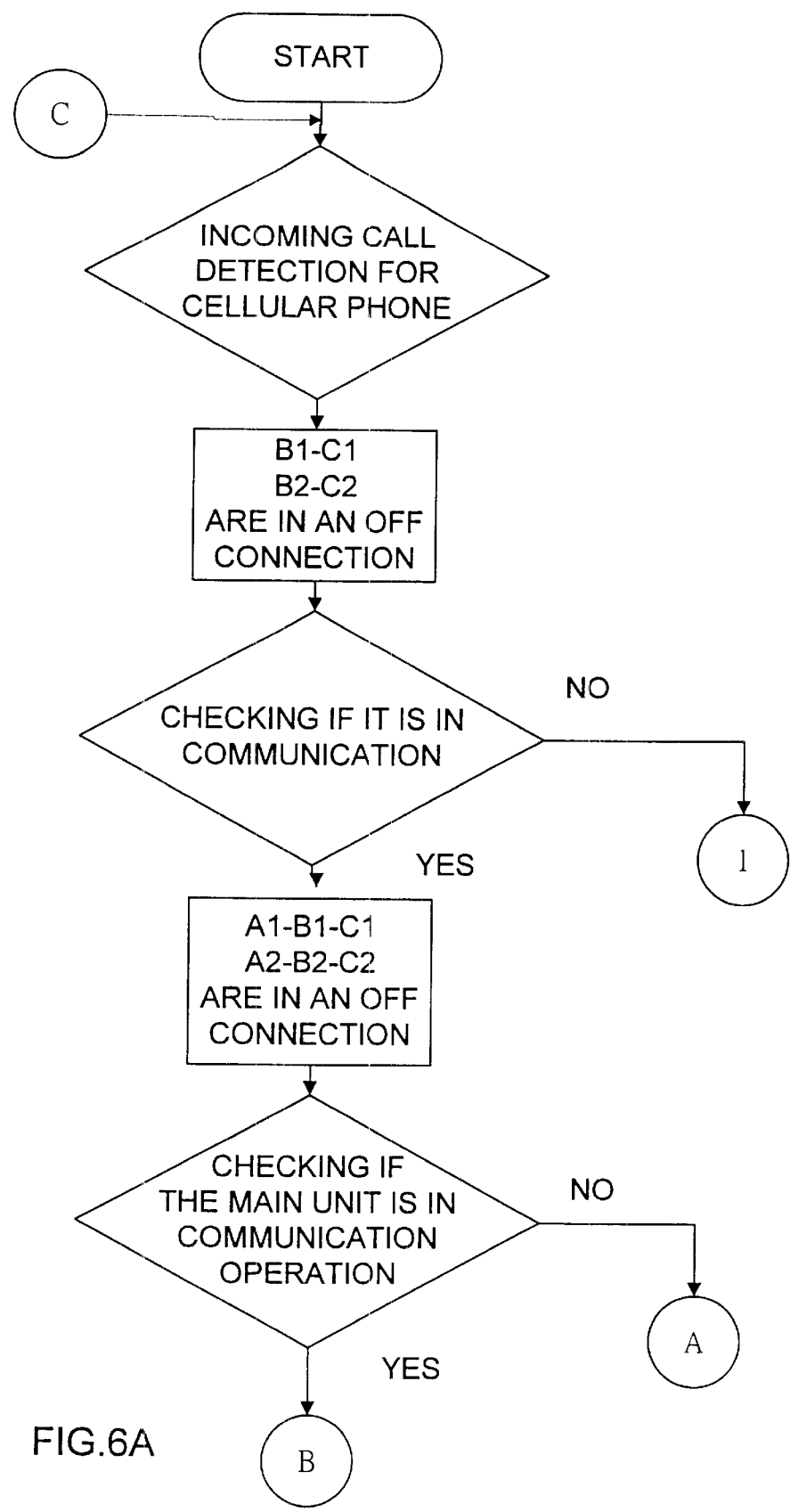
FIG. 6 is a first control flow chart of the switching device of the present invention.
Figure 6B:
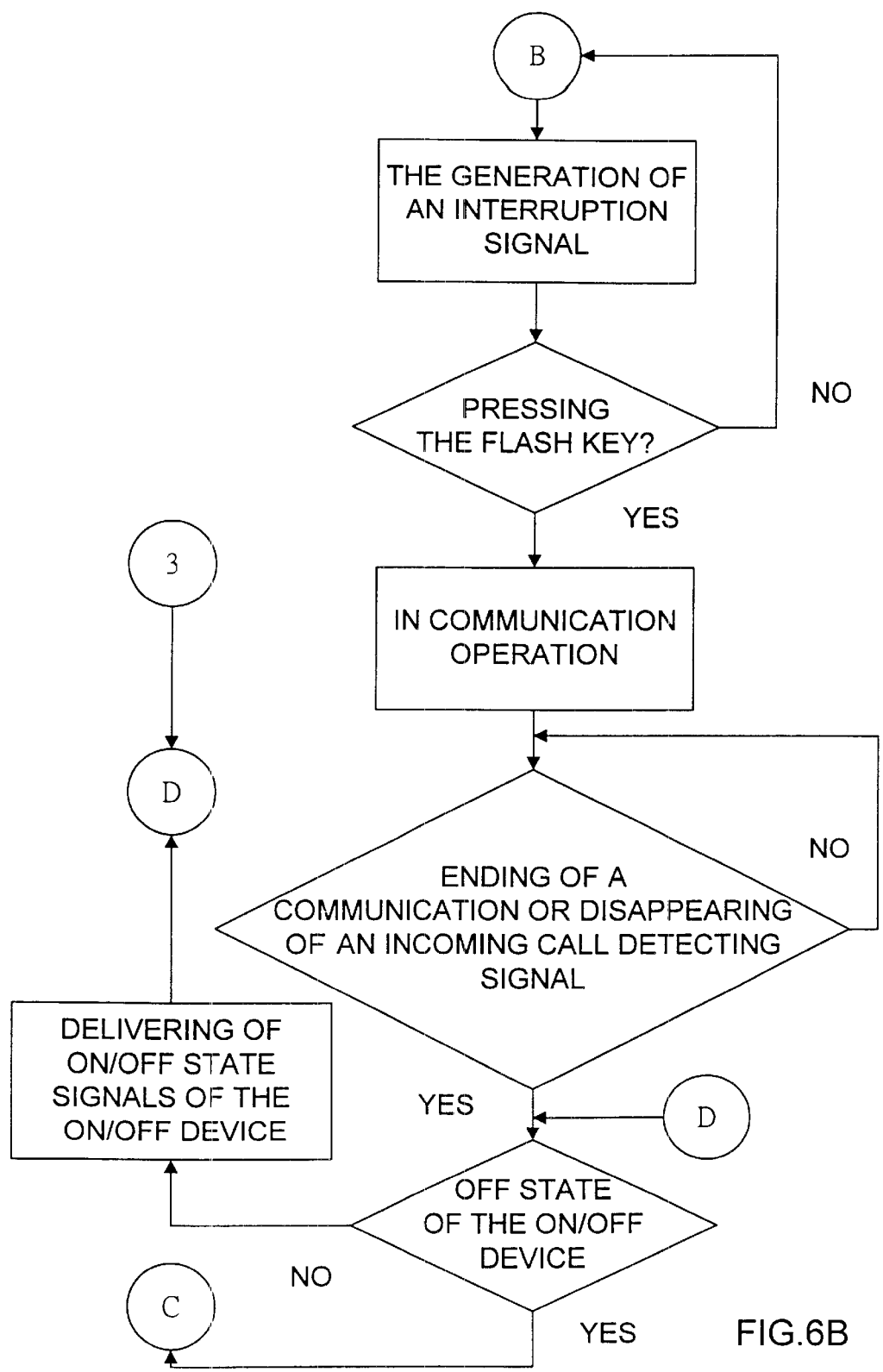
Figure 6C:
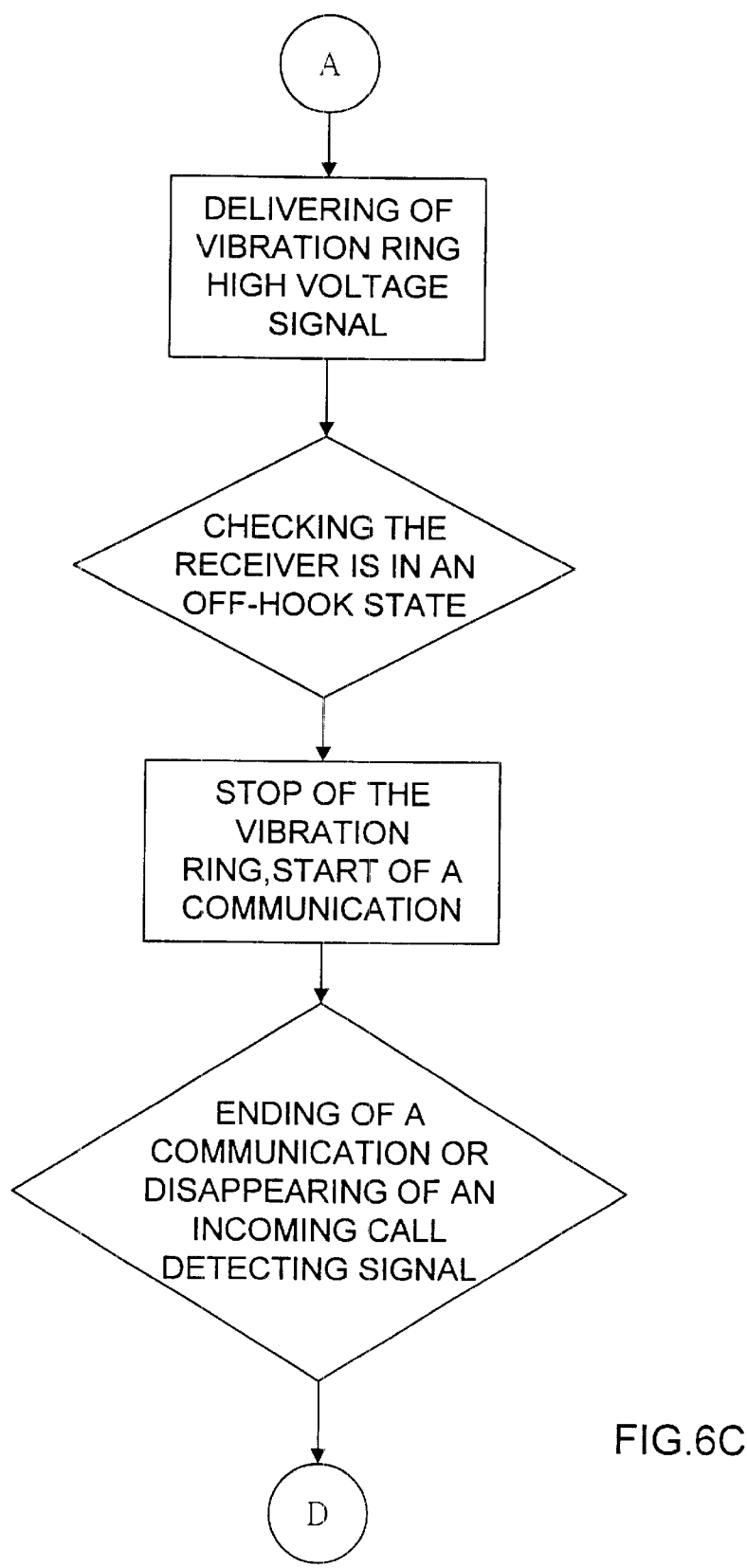
Figure 7A:
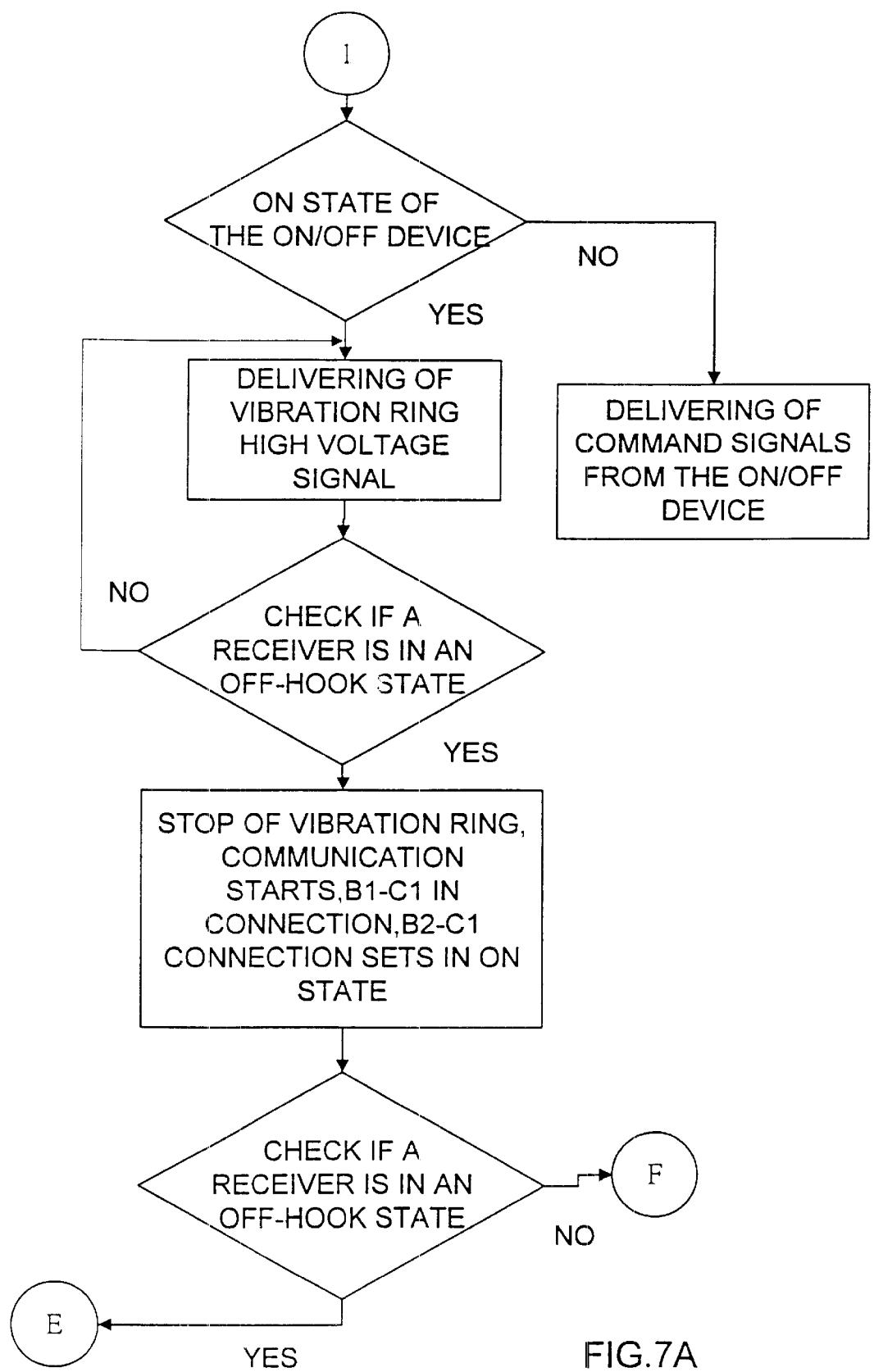
FIG. 7 is a second control flow chart of the present invention.
Figure 7B:
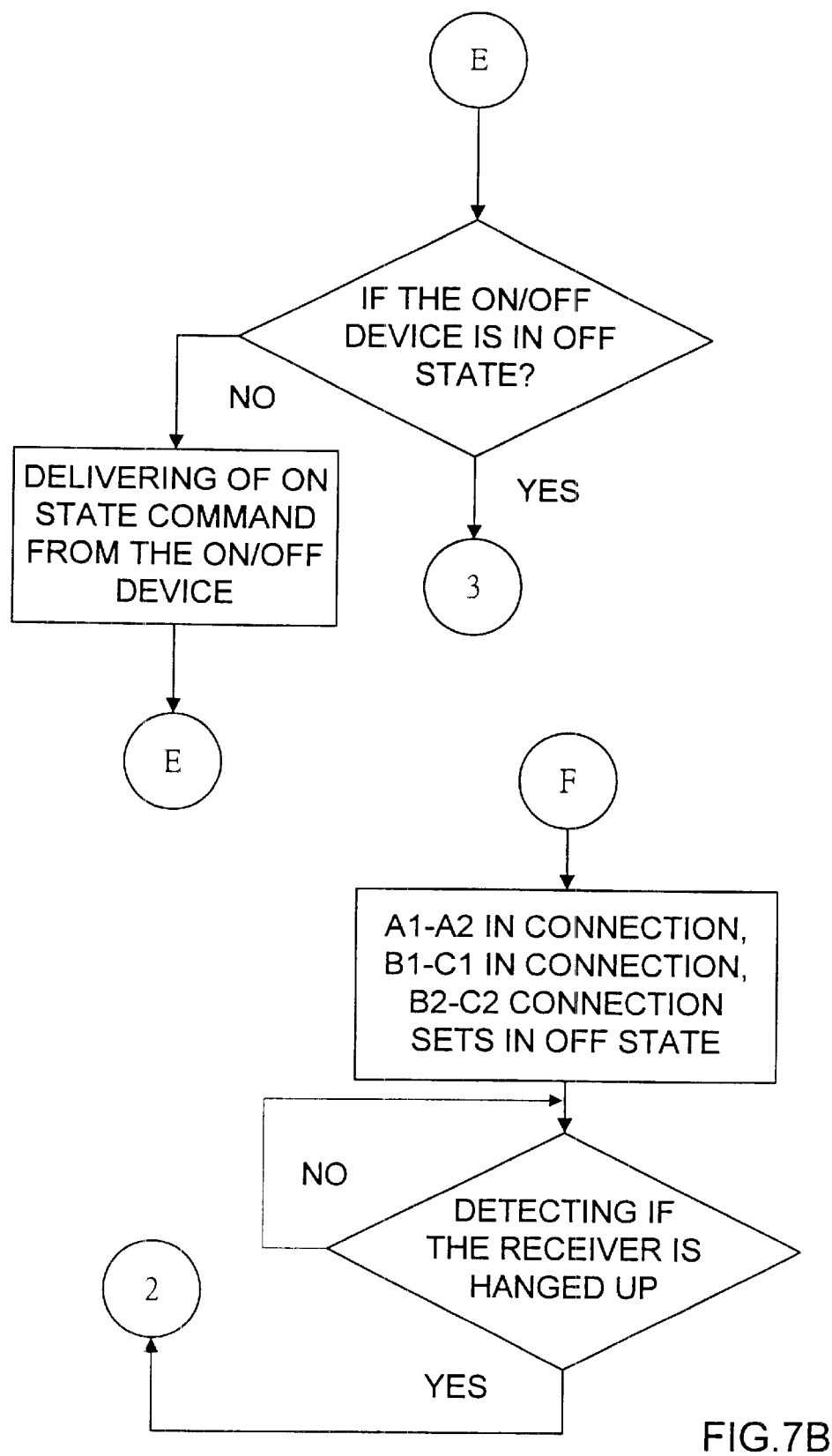

By way of the assembly of the above components, when the cellular phone T is receiving an incoming call, the cellular phone/fixed network telephone switching device 5 will operate according to the following procedures, as shown in FIGS. 6, 7.

1. The Detection of the Incoming Call of a Cellular Phone

When a cellular phone is receiving an incoming call, the incoming call detecting unit 54 will detect the incoming call and actuate the central control unit 56 to control over the on/off state control unit 59 and the fixed network telephone/cellular phone switching unit 53 to switch to the circuit of the fixed-network telephone 4. At this moment, the connection A1, B1, C1 and A2, B2, C2 of the fixed-network telephone/cellular phone switching unit 53 is put in an OFF state.

2. Detecting an OFF-HOOK State (1) When the on state/off-hook state detecting unit 58 detects that any one of the fixed network telephones 4 including the main telephone set 41 or the extension lines 42, 43, 44, 45 is put in an OFF-HOOK state, the central control unit 56 controls the on/off state control unit 59 to actuate the fixed network telephone/cellular phone switching unit 53 so as to switch the connection of B1, C1 and B2, C2 to an ON state.

(2) The main telephone set being in a communication state

As the main telephone set 41 is detected in a communication state, a call interruption signal is being issued to warn the user till the FLASH button (it functions identically to hang up a receiver and then pick it up again) is pressed for receiving. As a receiving action is completed with the receiver set in an ON-HOOK state or an incoming call detecting signal disappears and the on/off device 6 is set in an off state (if the on/off device 6 is in an on state, an on/off command signal for the on/off device is sent and received by the on/off command signal detecting unit for on/off device 61 so as to activate the central control and on/off control unit 63 to switch the connections D1, E1, D2, E2 of the switching unit 65 to an OFF state), a stand-by state is resumed.

(3) An extension line is being used for communication (it means an extension line being taken up)

The on/off device 6 issues a high voltage signal to actuate the vibration ring of the main telephone set 41 to produce a ringing sound. As a receiver is detected to be picked up (in an OFF-HOOK state), the vibration ring stops. When a call action is completed (the receiver being put in an ON-HOOK state), or an incoming call detecting signal disappears and the on/off device is in an off state (if the on/off device 6 is in an on state, an on/off command signal for the on/off device is sent and received by the on/off command signal detecting unit for on/off device 61 so as to activate the central control and on/off control unit 63 to switch the connections D1, E1, D2, E2 of the switching unit 65 to an OFF state), a stand-by state is resumed.

3. A non-communication State Being Detected (1) When the on/off device 6 is detected in an on state (if the on/off device 6 is in an off state, the central control unit 56 actuates the on state signal generating unit for on/off device 57 to transmit a signal which is detected by the on/off command signal detecting unit for on/off device 61 so as to activate the central control and on/off control unit 63 to switch the connections D1, E1, D2, E2 of the switching unit 65 to an OFF state), the on/off device 6 generates vibration ring high voltage signals to get the main telephone set 41 and the extension lines 42, 43, 44, 45 . . . to ring together.

(2) If an OFF-HOOK state is detected, then the vibration ring stops to operate; at this time, the connection lines between B1, C1 and B2, C2 of the fixed network telephone/cellular phone switching unit 53 are set in an ON state:

(A) if the main telephone set 41 is engaging in a receiving operation and the on/off device is in an off state (if it is in an on state, the on/off device 6 will be set in an off state by the on/off command signal generating unit of the on/off device), the internal circuit of the cellular phone/fixed network telephone main switching unit 5 is cut off if connection to the fixed network and the other extension lines are still in connection to the fixed network.

(B) If a phone call is received via the extension lines 42, 43, 44, 45 . . . . . . , then the connection lines A1, B1, C1 and A2, B2, C2 of the fixed network telephone/cellular phone switching unit 53 are set in an off state and are connected to other extension lines network telephone/cellular phone switching unit 53; and D1, D2, E1, E2 of the on/off device are put in an on state so as to make the main set and each extension line separated from the fixed network.

(3) After the completion of a communication, the receiver is put in an ON-HOOK state or the disappearance of a detection signal, and the on/off device is set in an off state (if it is in an on state, the on/off device 6 will be set in an off state by a on/off command signal generating unit), a stand-by state is resumed.

Figure 8:
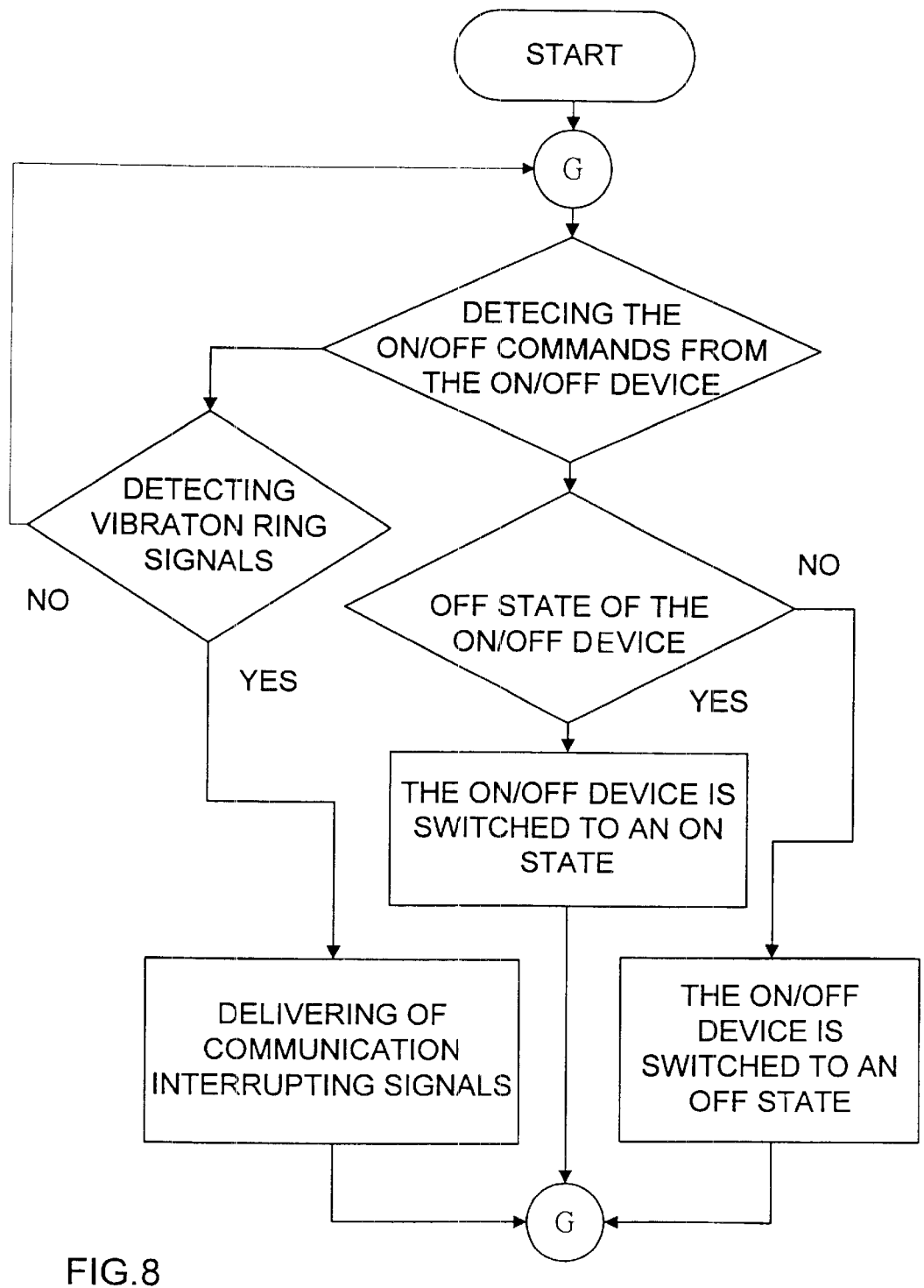
FIG. 8 is a control flow chart of the on/off device of the present invention.

As to the on/off device 6, it operates in the following procedures, as illustrated in FIG. 8:

1. When an on/off command signal is detected and if the on/off device 6 is originally set in an off state, then the on/off device 6 is switched to an on state; and if the on/off device 6 is originally set in an on state, then it is switched to an off state.

2. If no on/off command signal is detected and a vibration ring signal is detected (indicating the fixed network is being used for communication), then a communication interrupting signal is issued to warn the user of a cellular phone that an incoming call is being received.

Figure 9:
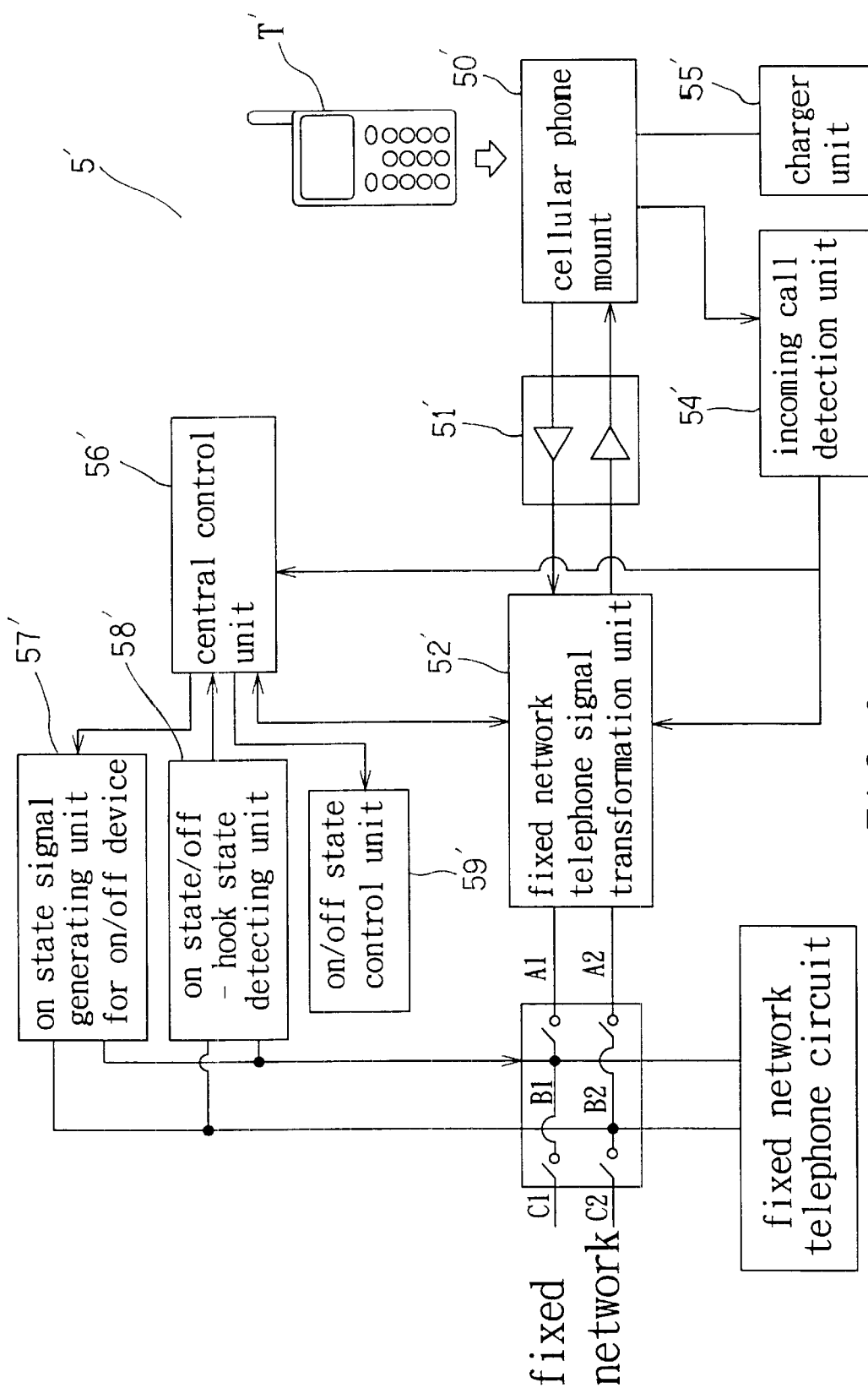
FIG. 9 is a diagram showing the circuit of the present invention in combination with a fixed network telephone.
Figure 10:
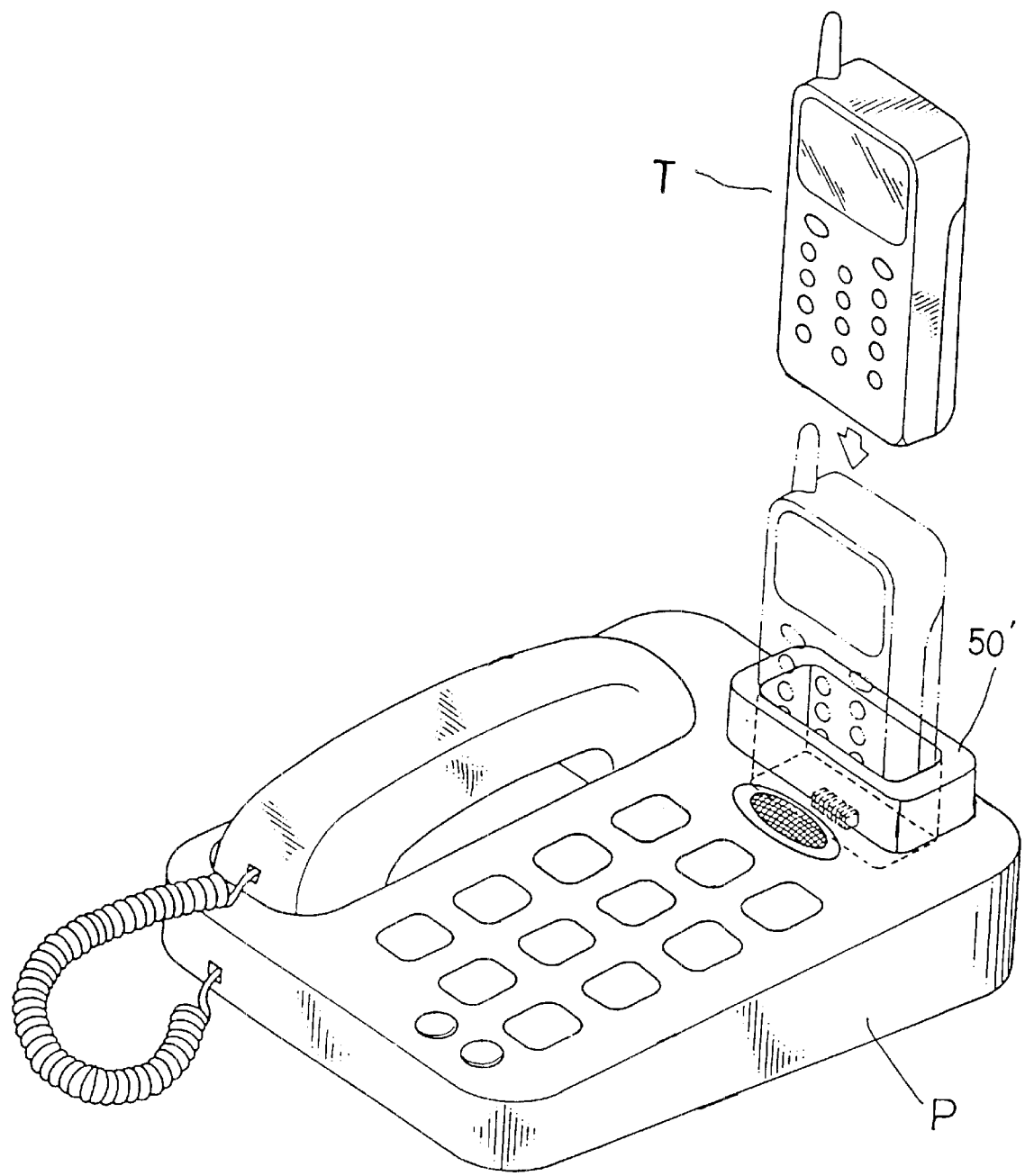
FIG. 10 is a diagram showing the second embodiment of the present invention.

The proceeding practical embodiment shows application of the devices of the present invention combined with a general fixed network telephone. On the same theoretical ground, the devices 5' of the present invention can be directly housed in a fixed network telephone P, as shown in FIGS. 9, 10, so as to permit people already having a fixed network telephone not to replace the old fixed network telephone.

If a user is not equipped with a fixed network telephone at first, a new fixed network telephone can be purchased according with the following recommended embodiment. It is made up of a cellular phone mount 50', an acoustic frequency signal amplifying unit 51', a fixed network telephone signal switching unit 52', a fixed network telephone/cellular phone switching unit 53', an incoming call detecting unit 54', a charger unit 55', a central control unit 56', an open circuit signal generating unit for on/off device 57', an on state/off-hook detecting unit 58', an on/off state control unit 59'. It is combined with a conventional fixed network telephone circuit to form a fixed network telephone P. All these components similar to those cited in the first embodiment are not repeatedly described. Thereby it provides a fixed network telephone P that can meet all the requirements of the present invention.

In summary, the present invention enables a cellular phone to receive calls via a fixed network telephone, and is particularly suitable for a fixed network telephone system having a plurality of extension lines.

I claim:

1. A cellular phone/fixed network telephone switching control device for transmitting calls received by a cellular phone to a fixed-network telephone, comprising a cellular phone/fixed network telephone switching device in cooperation with an on/off device; said cellular phone/fixed network telephone switching device further including a cellular phone mount and an acoustic frequency signal amplifying unit, a fixed network telephone signal transformation unit, a fixed network telephone/cellular phone switching unit, an incoming call detecting unit, a charger unit, a central control unit, an on state signal generating unit for said on/off device, an on state detecting unit of said on/off device and on state/off-hook state detecting unit and on/off state control unit; wherein:

said cellular phone mount having a housing space for receiving a cellular phone is connected to said switching device;

said acoustic frequency signal amplifying unit is used to properly amplify the output or input acoustic frequency signals of said cellular phone;

said fixed network telephone signal transformation unit is used to convert input and output acoustic frequency signals of a cellular phone into acoustic frequency signals compatible with specifications of a fixed network telephone;

said fixed network telephone/cellular phone switching unit is responsible for switching connection between a fixed network communication or cellular phone communication to a fixed-network telephone and is subject to the control of said incoming call detecting unit;

said incoming call detecting unit is used to detect if an incoming call is received and intercommunication of a cellular phone is being carried out so as to control the operational connection position of said fixed network telephone/cellular phone switching unit;

said charger unit is used to supply electrical power to a battery of the cellular phone;

wherein the improvement is characterized by that:

said central control unit is responsible for actuation of said on state signal generating unit for said on/off device, said on/off state control unit, a fixed network telephone signal transformation unit to operate according to detected results of said incoming call detecting unit and said on state and off-hook state;

said on state signal generating unit for said on/off device produces an on state operation signal of said on/off device subject to the control of said central control unit;

said on state signal generating unit for on/off device is controlled by said central control unit to output an on state actuation signal of said on/off device;

said on state/off-hook state detecting unit is responsible for detecting the on and off state of said on/off device and the off-hook state of a receiver of the fixed network telephone;

said on/off state control unit receives control signals transmitted from said central control unit to control the switching selection of said fixed network telephone/cellular phone switching unit.

2. The cellular phone/fixed network telephone switching control device as claimed in claim 1 wherein said on/off device comprises an on/off command signal detecting unit for said on/off device, a vibration ring echo signal generating unit, a central control and on/off control unit, a vibration ring high voltage signal detecting unit and a switching unit;

said on/off command signal detecting unit for on/off device 61 is employed to detect the on/off status of said on/off device for the use of said central control and on/off control unit;

said vibration ring echo signal generating unit is subject to the control of said central control and on/off control unit to produce vibration ring echo signals;

said central control and on/off control unit controls the on/off switching operation of said switching unit and controls the vibration ring echo signal generating unit to produce vibration ring echo signals according to the detected signals of said vibration ring high voltage signal detecting unit and said on/off command signal detecting unit for said on/off device;

said vibration ring high voltage signal detecting unit is responsible for detecting high voltage signals of said vibration ring;

said switching unit is controlled by said central control and on/off control unit to switch between on and off states of said on/off device.

3. The cellular phone/fixed network telephone switching control device as claimed in claim 1 wherein said switching control device can be internally housed inside a fixed network telephone so as to make said fixed network telephone operable accordingly.

* * * * *